United States Patent
Joseph et al.

(10) Patent No.: US 8,720,563 B2
(45) Date of Patent: May 13, 2014

(54) CALCIUM ALUMINATE CEMENT COMPOSITION CONTAINING A SET RETARDER OF AN ORGANIC ACID AND A POLYMERIC MIXTURE

(75) Inventors: Trissa Joseph, Houston, TX (US); Pankaj Phani Chakraborty, Navi Mumbai (IN); Mohand Melbouci, Wilmington, DE (US)

(73) Assignee: Halliburton Energy Services, Inc, Houston, TX (US)

( * ) Notice: Subject to any disclaimer, the term of this patent is extended or adjusted under 35 U.S.C. 154(b) by 113 days.

(21) Appl. No.: 13/467,421

(22) Filed: May 9, 2012

(65) Prior Publication Data

US 2013/0299170 A1  Nov. 14, 2013

(51) Int. Cl.
*E21B 33/13* (2006.01)
*C04B 28/06* (2006.01)
*C09K 8/467* (2006.01)

(52) U.S. Cl.
USPC ........... 166/293; 106/696; 106/802; 106/805; 166/294; 166/302; 507/207; 507/215; 507/260; 507/269

(58) Field of Classification Search
None
See application file for complete search history.

(56) References Cited

U.S. PATENT DOCUMENTS

| | | | |
|---|---|---|---|
| 5,447,197 A | 9/1995 | Rae et al. | |
| 5,547,506 A | 8/1996 | Rae et al. | |
| 6,143,069 A | 11/2000 | Brothers et al. | |
| 6,244,343 B1 | 6/2001 | Brothers et al. | |
| 6,332,921 B1 | 12/2001 | Brothers et al. | |
| 6,488,763 B2 | 12/2002 | Brothers et al. | |
| 6,708,760 B1 | 3/2004 | Chatterji et al. | |
| 6,796,378 B2 | 9/2004 | Reddy et al. | |
| 6,835,243 B2 | 12/2004 | Brothers et al. | |
| 6,846,357 B2 | 1/2005 | Reddy et al. | |
| 6,904,971 B2 | 6/2005 | Brothers et al. | |
| 7,008,479 B2 | 3/2006 | Chatterji et al. | |
| 7,021,380 B2 | 4/2006 | Caveny et al. | |
| 7,285,165 B2 | 10/2007 | Caveny et al. | |
| 7,337,842 B2 | 3/2008 | Roddy et al. | |
| 7,381,263 B2 | 6/2008 | Roddy et al. | |
| 7,390,356 B2 | 6/2008 | Kulakofsky et al. | |
| 7,398,827 B2 | 7/2008 | Kulakofsky et al. | |
| 7,462,234 B2 | 12/2008 | Reddy et al. | |
| 7,530,395 B2 | 5/2009 | Reddy et al. | |
| 7,642,223 B2 | 1/2010 | Santra et al. | |
| 7,748,454 B2 | 7/2010 | Reddy et al. | |
| 7,863,224 B2 | 1/2011 | Keys et al. | |
| 2001/0030044 A1* | 10/2001 | Brothers et al. | ............... 166/292 |
| 2006/0086502 A1 | 4/2006 | Reddy et al. | |
| 2012/0073813 A1* | 3/2012 | Zamora et al. | ................ 166/285 |

FOREIGN PATENT DOCUMENTS

| | | | |
|---|---|---|---|
| JP | 2820953 B | | 11/1998 |
| JP | 2820953 B2 | | 11/1998 |
| KR | 102010-0040143 A | | 4/2010 |
| KR | 1020100040143 A | | 4/2010 |
| WO | WO 2011-012922 A | | 2/2011 |
| WO | WO 2011012922 A1 | | 2/2011 |

OTHER PUBLICATIONS

Brothers et al, Synthetic Retarder for High-Strength Cement, SPE/IADC, 21976, Mar. 1991, 659-665.
Reddy et al, Trends in the Development of Environmentally Acceptable Additives for Zonal Isolation Applications, SPE, 65393, Feb. 2001, 1-7.
Dao et al, Environmentally Acceptable Cement Fluid Loss Additive, SPE, 74088, Mar. 2002, 1-6.
Dugonjic-Bilic et al, Study on Admixtures for Calcium Aluminate Phosphate Cement Useful to Seal CCS Wells, SPE, 141179, Apr. 2011, 1-12.
Roshan, Characteristics of Oilwell Cement Slurry Using CMC, SPE, 114246, Sep. 2010, 328-335.

\* cited by examiner

*Primary Examiner* — George Suchfield
(74) *Attorney, Agent, or Firm* — Craig Roddy; Sheri Higgins Law; Sheri Higgins

(57) ABSTRACT

A cement composition for use in an oil or gas well, the cement composition comprises: a calcium aluminate cement; water; an organic acid; and a polymeric mixture comprising: (A) water; (B) citric acid; (C) a first polymer, wherein the first polymer: (i) comprises a cellulose backbone and carboxymethyl functional groups; and (ii) has a molecular weight of less than 100,000; and (D) a second polymer, wherein the second polymer: (i) comprises a lignosulfonate; and (ii) has a molecular weight of less than 100,000, wherein a test composition consisting essentially of: the cement; the water; the organic acid; and the polymeric mixture, and in the same proportions as in the cement composition has a thickening time of at least 5 hours at a temperature of 300° F. (148.9° C.) and a pressure of 10,000 psi (68.9 MPa).

19 Claims, 1 Drawing Sheet

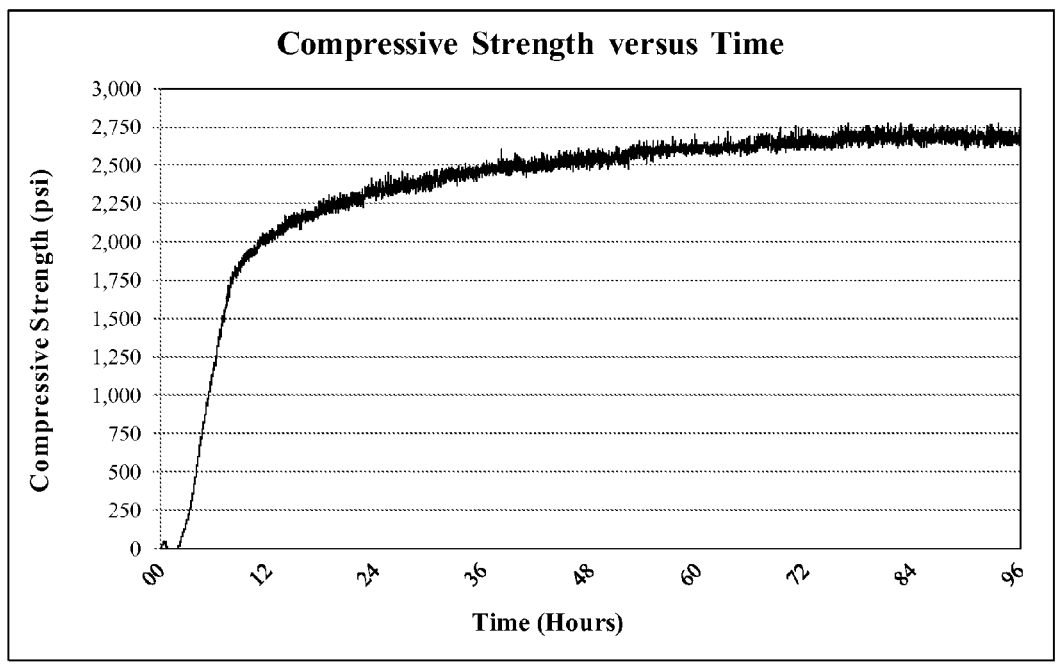

CALCIUM ALUMINATE CEMENT COMPOSITION CONTAINING A SET RETARDER OF AN ORGANIC ACID AND A POLYMERIC MIXTURE

TECHNICAL FIELD

A cement composition and methods of cementing in a subterranean formation are provided. The cement compositions include a set retarder of an organic acid and a polymeric mixture comprising: water; citric acid; a low-molecular weight polymer of carboxymethyl cellulose; and a low-molecular weight polymer of a lignosulfonate. The cement composition includes calcium aluminate cement. In another embodiment, the subterranean formation is a high-temperature well, or a sour gas or acid gas well.

SUMMARY

According to an embodiment, a cement composition for use in an oil or gas well, the cement composition comprises: a calcium aluminate cement; water; an organic acid; and a polymeric mixture comprising: (A) water; (B) citric acid; (C) a first polymer, wherein the first polymer: (i) comprises a cellulose backbone and carboxymethyl functional groups; and (ii) has a molecular weight of less than 100,000; and (D) a second polymer, wherein the second polymer: (i) comprises a lignosulfonate; and (ii) has a molecular weight of less than 100,000, wherein a test composition consisting essentially of: the cement; the water; the organic acid; and the polymeric mixture, and in the same proportions as in the cement composition has a thickening time of at least 5 hours at a temperature of 300° F. (148.9° C.) and a pressure of 10,000 psi (68.9 MPa)

According to another embodiment, a method of cementing in a subterranean formation comprises: introducing the cement composition into the subterranean formation; and allowing the cement composition to set.

DETAILED DESCRIPTION OF THE INVENTION

As used herein, the words "comprise," "have," "include," and all grammatical variations thereof are each intended to have an open, non-limiting meaning that does not exclude additional elements or steps.

As used herein, the words "consisting essentially of," and all grammatical variations thereof are intended to limit the scope of a claim to the specified materials or steps and those that do not materially affect the basic and novel characteristic(s) of the claimed invention. For example, the test composition consists essentially of: the cement; the water; the organic acid; and the polymer, and in the same proportions as in the cement composition. The test composition can contain other ingredients so long as the presence of the other ingredients does not materially affect the basic and novel characteristics of the claimed invention, i.e., so long as the test composition has a thickening time of at least 5 hours at a temperature of 300° F. (148.9° C.) and a pressure of 10,000 psi (68.9 MPa).

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A colloid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase.

As used herein, a "cement composition" is a mixture of at least cement and water. A cement composition can include additives. As used herein, the term "cement" means an initially dry substance that develops compressive strength or sets in the presence of water. An example of cement is Portland cement. A cement composition is generally a slurry in which the water is the continuous phase of the slurry and the cement (and any other insoluble particles) is the dispersed phase. The continuous phase of a cement composition can include dissolved solids.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas or water producing well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During well completion, it is common to introduce a cement composition into an annulus in a wellbore. For example, in a cased-hole wellbore, a cement composition can be placed into and allowed to set in an annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, or squeeze cementing.

During cementing operations, it is necessary for the cement composition to remain pumpable during introduction into the well and until the composition is situated in the portion of the well to be cemented. After the cement composition has reached the portion of the well to be cemented, the cement composition ultimately sets. As used herein, the term "set" and all grammatical variations thereof means the process of becoming hard or solid through curing. A cement composition that thickens too quickly while being pumped can damage pumping equipment or block tubing or pipes, and a cement composition that sets too slowly can cost time and money while waiting for the composition to set.

Often times, a wellbore fluid, such as a cement composition, is modified for use in challenging wellbores. Examples of challenging wellbores include, but are not limited to, high temperature and/or high pressure wells, wells containing high amounts of an acid gas, such as carbon dioxide gas (acid gas wells), steam injection wells, steam production wells, geothermal wells, and wells containing high amounts of a sour gas, such as hydrogen sulfide gas (sour gas wells). For example, at high static subterranean temperatures, and in the presence of brines containing carbon dioxide, conventional cement compositions containing hydraulic cements (e.g., Portland cement), particularly those which exhibit high pH (i.e., greater than 11), rapidly deteriorate due to carbonation of alkaline components of the set cement such as calcium hydroxide. Thus, the use of conventional hydraulic cement compositions, such as Portland cement, in these types of environments may result in the loss of wellbore integrity. An alternative to using conventional hydraulic cements in challenging wellbores is the use of a calcium aluminate based cement (CABC). CABC has a higher temperature resistance compared to Portland cement/silica mixtures, which can lead to a longer term integrity of the cement sheath. The use of CABC offers other advantages as it provides resistance to sulfates, corrosion, and sour gas. Calcium Aluminate Cements (CACs), when combined with a soluble phosphate salt (e.g., sodium metaphosphate) and a pozzolanic material (e.g., Class F fly ash), form cement compositions that upon setting, can exhibit improved physical and mechanical properties. Some of the improved properties include, binding to the subterranean formation and/or casing and to itself, a higher compressive strength, carbonation and corrosion resistance, and low permeability.

A variety of CACs are commercially available with varying alumina contents. While attractive from an economic standpoint, one drawback to the use of CACs is their unpredictable thickening times even when set retarders such as citric acid are used, especially at elevated temperatures, for example at temperatures greater than 200° F. (93.3° C.). As such, the unpredictable thickening times of CAC slurries make well cementing with these types of cement a challenge. A need therefore exists for materials that can retard the CAC slurries so that the CAC slurry may display predictable thickening times and remain pumpable before and during placement into the desired wellbore location.

It is to be understood that if any test (e.g., thickening time) requires the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about 1.67° C./min to about 2.78° C./min). The purpose of the specific rate of temperature ramping during measurement is to simulate the temperature profile experienced by the cement composition as it is being pumped downhole. After the cement composition is ramped up to the specified temperature and possibly specified pressure, the cement composition is maintained at that temperature and pressure for the duration of the testing.

As used herein, the "thickening time" is how long it takes for a cement composition to become unpumpable at a specified temperature and pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc. As used herein, the consistency of a cement composition is measured according to API Recommended Practice 10-B2, First Edition, July 2005 as follows. The cement composition is first mixed according to the following procedure. The water is added to a mixing container and the container is then placed on a mixer base. The motor of the base is then turned on and maintained at 4,000 revolutions per minute "rpm" (+/−200 rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). The cement composition is then placed in the test cell of a High-Temperature, High-Pressure (HTHP) consistometer, such as a FANN® Model 290 or a Chandler Model 8240. Consistency measurements are taken continuously until the cement composition exceeds 70 Bc.

Another desirable property of a cement composition is that the composition exhibit good rheology. Rheology is a measure of how a material deforms and flows. As used herein, the "rheology" of a cement composition is measured according to API Recommended Practice 10-B2, First Edition, July 2005 as follows. The cement composition is mixed. The cement composition is placed into the test cell of a rotational viscometer, such as a FANN® Model 35 viscometer, fitted with a Bob and Sleeve attachment and a spring number 1. The cement composition is tested at the specified temperature and ambient pressure, about 1 atm (0.1 MPa). Rheology readings are taken at multiple rpm's, for example, at 3, 6, 100, 200, 300, and 600.

A cement composition can develop compressive strength. Cement composition compressive strengths can vary from 0 psi to over 10,000 psi (0 to over 69 MPa). Compressive strength is generally measured at a specified time after the composition has been mixed and at a specified temperature and pressure. Compressive strength can be measured, for example, at a time of 24 hours. According to ANSI/API Recommended Practice 10B-2, compressive strength can be measured by either a destructive method or non-destructive method.

The non-destructive method continually measures correlated compressive strength of a cement composition sample throughout the test period by utilizing a non-destructive sonic device such as an Ultrasonic Cement Analyzer (UCA) available from FANN® Instruments in Houston, Tex. As used herein, the "compressive strength" of a cement composition is measured using the non-destructive method at a specified time, temperature, and pressure as follows. The cement composition is mixed. The cement composition is then placed in an Ultrasonic Cement Analyzer and tested at a specified temperature and pressure. The UCA continually measures the transit time of the acoustic signal through the sample. The UCA device contains preset algorithms that correlate transit time to compressive strength. The UCA reports the compressive strength of the cement composition in units of pressure, such as psi or MPa.

The compressive strength of a cement composition can be used to indicate whether the cement composition has initially set or is set. As used herein, a cement composition is considered "initially set" when the cement composition develops a compressive strength of 50 psi (0.3 MPa) using the non-destructive compressive strength method at a temperature of 212° F. (100° C.) and a pressure of 3,000 psi (20 MPa). As used herein, the "initial setting time" is the difference in time between when the cement and any other ingredients are added to the water and when the composition is initially set.

As used herein, the term "set," and all grammatical variations thereof, are intended to mean the process of becoming hard or solid by curing. As used herein, the "setting time" is the difference in time between when the cement and any other ingredients are added to the water and when the composition has set at a specified temperature. It can take up to 48 hours or longer for a cement composition to set. Some cement compositions can continue to develop compressive strength over the course of several days. The compressive strength of a cement composition can reach over 10,000 psi (69 MPa).

A set retarder can be added to a cement composition to help increase the thickening time of the cement composition such that the cement composition remains pumpable for a desired time at a specific temperature. The thickening time is proportional to the setting time, i.e., the longer the thickening time, the longer the setting time will be. Therefore, a set retarder can be added to a cement composition to help increase the setting time of the cement composition. However, if a set retarder is in too-high a concentration, the cement composition may remain in a fluid state for an undesirably long period of time, often referred to as the Waiting-on-Cement (WOC) time, during which no further operations can be performed on the wellbore. Therefore, the set retarder also can be used in a concentration such that the cement composition sets in a desired time.

Set retarders can be a polymer. A polymer is a large molecule composed of repeating units, typically connected by covalent chemical bonds. The number of repeating units of a polymer can range from approximately 11 to greater than 10,000. The number of repeating units of a polymer is referred to as the chain length of the polymer. A polymer is formed from the polymerization reaction of monomers. During the polymerization reaction, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. In a copolymer, the repeating units from each of the monomers can be arranged in various ways along the polymer chain. For example, the repeating units can be random, alternating, periodic, or block. The conditions of the polymerization reaction can be adjusted to help control the average number of repeating units (the average chain length) of the polymer.

A polymer has an average molecular weight, which is directly related to the average chain length of the polymer. The average molecular weight of a polymer has an impact on some of the physical characteristics of a polymer, for example, its solubility in water, its viscosity, and its biodegradability. For a copolymer, each of the monomers will be repeated a certain number of times (number of repeating units). The average molecular weight for a copolymer can be expressed as follows:

$$\text{Avg. molecular weight} = (M.W.m_1 * RU\, m_1) + (M.W.m_2 * RU\, m_2).$$

where $M.W.m_1$ is the molecular weight of the first monomer; $RU\, m_1$ is the number of repeating units of the first monomer; $M.W.m_2$ is the molecular weight of the second monomer; and $RU\, m_2$ is the number of repeating units of the second monomer. Of course, a terpolymer would include three monomers, a tetra polymer would include four monomers, and so on.

It has been discovered that an organic acid and a polymeric mixture can function effectively as a set retarder for calcium aluminate cement (CAC) compositions. The cement composition can be used in challenging wellbores, such as high-temperature wells, or sour gas or acid gas wells. As used herein, a high-temperature well is a well with a bottomhole temperature of at least 200° F. (93.3° C.). As used herein, the bottomhole temperature refers to the downhole temperature, often referred to as Bottom Hole Circulating Temperature (BHCT), at the portion of the well to be cemented.

According to an embodiment, a cement composition for use in an oil or gas well, the cement composition comprises: a calcium aluminate cement; water; an organic acid; and a polymeric mixture comprising: (A) water; (B) citric acid; (C) a first polymer, wherein the first polymer: (i) comprises a cellulose backbone and carboxymethyl functional groups; and (ii) has a molecular weight of less than 100,000; and (D) a second polymer, wherein the second polymer: (i) comprises a lignosulfonate; and (ii) has a molecular weight of less than 100,000, wherein a test composition consisting essentially of: the cement; the water; the organic acid; and the polymeric mixture, and in the same proportions as in the cement composition has a thickening time of at least 5 hours at a temperature of 300° F. (148.9° C.) and a pressure of 500 psi (3.4 MPa).

According to another embodiment, a method of cementing in a subterranean formation comprises: introducing the cement composition into the subterranean formation; and allowing the cement composition to set.

It is to be understood that the discussion of preferred embodiments regarding the cement composition or any ingredient in the cement composition, is intended to apply to the composition embodiments and the method embodiments. Any reference to the unit "gallons" means U.S. gallons.

The cement composition includes a calcium aluminate cement (CAC). The CAC comprises at least calcium, aluminum, and oxygen. According to an embodiment, the CAC comprises aluminum oxide ($Al_2O_3$) and calcium oxide (CaO). The aluminum oxide can be present in the CAC in an amount in the range of about 30 weight (wt.) % to about 80 wt. %, alternatively from about 40 wt. % to about 70 wt. %, or alternatively from about 50 wt. % to about 60 wt. %, based upon the total weight of the CAC. The calcium oxide can be present in the CAC in an amount in the range of about 20 wt. % to about 60 wt. %, alternatively from about 30 wt. % to about 50 wt. %, or alternatively from about 35 wt. % to about 40 wt. %, based upon the total weight of the CAC. Additionally, the aluminum oxide to calcium oxide ($Al_2O_3$/CaO) weight ratio in the CAC may vary from about 1:1 to about 4:1, alternatively from about 2:1 to about 1.5:1. An example of a commercially-available calcium aluminate-based cement is ThermaLock™, marketed by Halliburton Energy Services.

The cement composition includes water. The water can be selected from the group consisting of freshwater, brackish water, and saltwater, in any combination thereof in any proportion. The cement composition can also include a salt. Preferably, the salt is selected from sodium chloride, calcium chloride, calcium bromide, potassium chloride, potassium bromide, magnesium chloride, and any combination thereof in any proportion. Preferably, the salt is in a concentration in the range of about 0.1% to about 40% by weight of the water.

According to an embodiment, the cement composition has a density of at least 9 pounds per gallon (ppg). The cement composition can have a density in the range of about 9 to about 22 ppg.

The cement composition includes an organic acid. As used herein, an "organic acid" is an organic compound (i.e., containing at least one carbon atom) that is a proton donor. Examples of organic acids include, but are not limited to, carboxylic acid, sulfonic acid, lactic acid, acetic acid, formic acid, citric acid, tartaric acid, oxalic acid, uric acid, ascorbic acid, and peracetic acid. The organic acid can be selected from the group consisting of citric acid, tartaric acid, lactic acid, ascorbic acid, and combinations thereof. According to an embodiment, the organic acid has a pKa of less than 7, preferably in the range of about 0 to about 7. Commercially-available examples of suitable organic acids include, but are not limited to, Fe-2™ and HR®-25, marketed by Halliburton Energy Services, Inc.

The cement composition includes a polymeric mixture. The polymeric mixture includes water. The water can be selected from the group consisting of freshwater, brackish water, and saltwater, in any combination thereof in any proportion.

The polymeric mixture includes citric acid.

The polymeric mixture includes a first polymer, wherein the first polymer: comprises a cellulose backbone and carboxymethyl functional groups; and has a molecular weight of less than 100,000. A polymer comprising a cellulose backbone and carboxymethyl functional groups is commonly called carboxymethyl cellulose (CMC). The polymer can be formed from an alkali-catalyzed reaction of cellulose and chloroacetic acid. The carboxymethyl functional groups can become bound to one or more of the hydroxyl functional groups of the cellulose backbone. The maximum theoretical hydroxyl groups that could be substituted can be 3. This number is known as degree of substitution (DS), and represents the average number of hydroxyl groups that have substituted during the carboxylation reaction. For optimum solubility, the DS can be greater than 0.40. At lower DS values, the CMC has a tendency to swell rather than dissolve. According to an embodiment, the DS of hydroxyl groups of the first polymer is in a range from 0.4 to 2.0, preferably from 0.90 to 1.30. The first polymer has a molecular weight of less than 100,000, preferably a molecular weight of less than about 30,000, and more preferably a molecular weight of less than about 25,000. A commercially-available example of a suitable first polymer is Ambergum® 3021 carboxymethyl cellulose, available from Ashland Specialty Ingredients in Wilmington, Del.

The polymeric mixture includes a second polymer, wherein the second polymer comprises a lignosulfonate and has a molecular weight of less than 100,000. The lignosulfonate can include one or more functional groups. The functional group can be, without limitation, sodium. The second polymer has a molecular weight of less than 100,000, preferably a molecular weight of less than about 30,000, and more preferably a molecular weight of less than about 25,000.

The ingredients making up the polymeric mixture can be in a variety of ratios. According to an embodiment, the ratio of the first polymer, second polymer, citric acid, and water is in the range from about 35:14:7:44 to about 80:4:2:14. Preferably, the ratio of the first polymer, second polymer, citric acid, and water is 44:13:6:37.

A test composition consisting essentially of: the cement; the water; the organic acid; and the polymeric mixture, and in the same proportions as in the cement composition has a thickening time of at least 5 hours at a temperature of 300° F. (148.9° C.) and a pressure of 10,000 psi (68.9 MPa). According to an embodiment, the organic acid and the polymeric mixture are in at least a sufficient concentration such that the test composition has a thickening time of at least 5 hours at a temperature of 300° F. (148.9° C.) and a pressure of 10,000 psi (68.9 MPa). The organic acid and the polymeric mixture can also be in at least a sufficient concentration such that the test composition has a thickening time in the range of about 5 to about 15 hours at a temperature of 300° F. (148.9° C.) and a pressure of 10,000 psi (68.9 MPa). According to another embodiment, the organic acid and the polymeric mixture are in at least a sufficient concentration such that the test composition has a thickening time of at least 5 hours at at least one temperature in the range of about 200° F. to about 370° F. (about 93.3° C. to about 187.8° C.) and a pressure of 10,000 psi (68.9 MPa). The organic acid and the polymeric mixture can also be in at least a sufficient concentration such that the test composition has a thickening time in the range of about 5 to about 15 hours at at least one temperature in the range of about 200° F. to about 370° F. (about 93.3° C. to about 187.8° C.) and a pressure of 10,000 psi (68.9 MPa).

The cement composition can have a thickening time of at least 5 hours at a temperature of 300° F. (148.9° C.) and a pressure of 10,000 psi (68.9 MPa). According to an embodiment, the organic acid and the polymeric mixture are in at least a sufficient concentration such that the cement composition has a thickening time of at least 5 hours at a temperature of 300° F. (148.9° C.) and a pressure of 10,000 psi (68.9 MPa). The organic acid and the polymeric mixture can also be in at least a sufficient concentration such that the cement composition has a thickening time in the range of about 5 to about 15 hours at a temperature of 300° F. (148.9° C.) and a pressure of 10,000 psi (68.9 MPa). According to another embodiment, the organic acid and the polymeric mixture are in at least a sufficient concentration such that the cement composition has a thickening time of at least 5 hours at at least one temperature in the range of about 200° F. to about 370° F. (about 93.3° C. to about 187.8° C.) and a pressure of 10,000 psi (68.9 MPa). The organic acid and the polymeric mixture can also be in at least a sufficient concentration such that the cement composition has a thickening time in the range of about 5 to about 15 hours at at least one temperature in the range of about 200° F. to about 370° F. (about 93.3° C. to about 187.8° C.) and a pressure of 10,000 psi (68.9 MPa). According to another embodiment, the organic acid and the polymeric mixture are in at least a sufficient concentration such that the cement composition has a thickening time of at least 5 hours at the bottomhole temperature and pressure of the well. The organic acid and the polymeric mixture can be in at least a sufficient concentration such that the cement composition has a thickening time in the range of about 5 to about 15 hours, alternatively of about 6 to about 10 hours, at the bottomhole temperature and pressure of the well. One of skill in the art will be able to determine the concentration of the organic acid and the polymeric mixture needed in order to achieve the desired thickening time, for example, based on the bottom-hole temperature of the well, and other specific conditions of the well, such as the amount of sour gas or an acid gas present.

According to an embodiment, the organic acid and the polymeric mixture are in at least a sufficient concentration such that the cement composition has a compressive strength greater than 1,000 psi (6.9 MPa), preferably greater than 2,000 psi (13.8 MPa), at a temperature of 400° F. (204.4° C.), preferably at at least one temperature in the range of about 200° F. to about 370° F. (about 93.3° C. to about 187.8° C.). According to another embodiment, the organic acid and the polymeric mixture are in at least a sufficient concentration such that the cement composition has a compressive strength greater than 1,000 psi (6.9 MPa), preferably greater than 2,000 psi (13.8 MPa), at the bottomhole temperature of the well.

According to an embodiment, the organic acid and the polymeric mixture are in a concentration equal to or less than a sufficient concentration such that the cement composition has an initial setting time of less than 48, preferably less than 24, hours at a temperature of 300° F. (148.9° C.), preferably at at least one temperature in the range of about 200° F. to about 370° F. (about 93.3° C. to about 187.8° C.). According to another embodiment, the organic acid and the polymeric mixture are in a concentration equal to or less than a sufficient concentration such that the cement composition has an initial setting time of less than 48, preferably less than 24, hours at the bottomhole temperature of the well.

According to an embodiment, the organic acid and the polymeric mixture are in a concentration equal to or less than a sufficient concentration such that the cement composition has a setting time of less than 48, preferably less than 24, hours at a temperature of 300° F. (148.9° C.), preferably at at least one temperature in the range of about 200° F. to about 370° F. (about 93.3° C. to about 187.8° C.). According to another embodiment, the organic acid and the polymeric mixture are in a concentration equal to or less than a sufficient concentration such that the cement composition has a setting time of less than 48, preferably less than 24, hours at the bottomhole temperature of the well.

The organic acid can be in a concentration of at least 0.2% by weight of the cement (bwoc). The organic acid can also be in a concentration in the range of about 0.2% to about 4% bwoc, preferably about 0.5% to about 3% bwoc.

The polymeric mixture can be in a concentration of at least 0.05% by weight of the cement (bwoc). The polymeric mixture can be in a concentration in the range of about 0.05% to about 10% bwoc, preferably in the range of about 0.1% to about 1% bwoc.

The cement composition can be used in a variety of wells. Examples of wells the cement composition can be used in include, without limitation, high-temperature and/or high-pressure wells, geothermal wells, sour gas wells, and acid gas wells. The subterranean formation can have a bottomhole temperature of at least 200° F. (93.3° C.). The subterranean formation can have a bottomhole temperature in the range of about 200° F. to about 370° F. (about 93.3° C. to about 187.8° C.).

The cement composition can further include other additives. Examples of other additives include, but are not limited to, a filler, a fluid loss additive, a friction reducer, a light-weight additive, a defoaming agent, a high-density additive, a mechanical property enhancing additive, a lost-circulation material, a filtration-control additive, a thixotropic additive, and combinations thereof.

The cement composition can include a filler. Suitable examples of fillers include, but are not limited to, fly ash, sand, clays, and vitrified shale. Preferably, the filler is in a concentration in the range of about 5% to about 50% by weight of the cement (bwoc).

The cement composition can include a fluid loss additive. The fluid loss additive can be a cationic starch as described in U.S. Pat. No. 6,846,357, issued on Jan. 25, 2005 to Reddy et al., and U.S. Pat. No. 6,796,378, issued on Sep. 28, 2004 to Reddy et al., or polymers capable of viscosifying an aqueous acid as described in a pending U.S. patent application Ser. No. 12/961,234, filed on Dec. 6, 2010 and having for named inventors Trissa Joseph et al., each of which is incorporated by reference herein in its entirety. Preferably, the fluid loss additive is in a concentration in the range of about 0.05% to about 10% bwoc.

The cement composition can include a friction reducer. Suitable examples of commercially-available friction reducers include, but are not limited to, CFR-2™, CFR-3™, CFR-5LE™, CFR-6™, and CFR-8™, marketed by Halliburton Energy Services, Inc. Preferably, the friction reducer is in a concentration in the range of about 0.1% to about 10% bwoc.

Commercially-available examples of other additives include, but are not limited to, and are marketed by Halliburton Energy Services, Inc. under the tradenames HIGH DENSE® No. 3, HIGH DENSE® No. 4, BARITE™, and MICROMAX™, heavy-weight additives; SILICALITE™, extender and compressive-strength enhancer; WELLLIFE® 665, WELLLIFE® 809, and WELLLIFE® 810 mechanical property enhancers.

The method embodiments include the step of introducing the cement composition into the subterranean formation. The step of introducing can be for the purpose of at least one of the following: well completion; foam cementing; primary or secondary cementing operations; well-plugging; squeeze cementing; and gravel packing. The cement composition can be in a pumpable state before and during introduction into the subterranean formation. In an embodiment, the subterranean formation is penetrated by a well. The well can be, without limitation, an oil, gas, or water production well, or an injection well. According to this embodiment, the step of introducing includes introducing the cement composition into the well. According to another embodiment, the subterranean formation is penetrated by a well and the well includes an annulus. According to this other embodiment, the step of introducing includes introducing the cement composition into a portion of the annulus.

The method embodiments also include the step of allowing the cement composition to set. The step of allowing can be after the step of introducing the cement composition into the subterranean formation. The method embodiments can include the additional steps of perforating, fracturing, or performing an acidizing treatment, after the step of allowing.

EXAMPLES

To facilitate a better understanding of the present invention, the following examples of certain aspects of preferred embodiments are given. The following examples are not the only examples that could be given according to the present invention and are not intended to limit the scope of the invention.

Unless otherwise stated, each of the cement compositions had a density of 15.0 pounds per gallon (ppg) (1.797 kilograms per liter "kg/L") and contained at least the following ingredients: tap water at a concentration of 40% by weight of the cement "bwoc"; ThermaLock™ cement comprising calcium aluminate; and D-Air 3000L™ defoamer at a concentration of 0.02 gallons per sack of the cement "gal/sk". The cement compositions also included, in varying concentrations, a polymeric mixture and Fe-2™ organic acid. The polymeric mixture included a first polymer of Ambergum®

3021 carboxymethyl cellulose having a molecular weight of 25,000, a second polymer of sodium lignosulfonate having a molecular weight of less than 30,000, citric acid, and water. The ratio of the first polymer, second polymer, organic acid, and water was 43.5:13:6.5:37.

All of the cement compositions were mixed and tested according to the procedure for the specific test as described in The Detailed Description section above. The thickening time tests were conducted at a variety of temperatures and a pressure of 10,000 psi (68.9 MPa).

Table 1 contains thickening time data for the cement compositions at various temperatures and varying concentrations of the organic acid and polymeric mixture. As can be seen in Table 1, regarding composition numbers 1-3, the compositions that did not contain both, the organic acid and the polymeric mixture had thickening times of less than 2 hours; whereas, composition #1 containing both ingredients had a thickening time of greater than 7 hours. This indicates that at a temperature of 300° F., the organic acid and the polymeric mixture are needed in order to increase the thickening time of the cement composition. As can also be seen with reference to composition numbers 4-10, the organic acid and the polymeric mixture function effectively as a set retarder from temperatures ranging from 200° F. to 370° F. Moreover, with reference to composition numbers 11-13, for a given concentration of the organic acid, the concentration of the polymeric mixture may need to be increased in order to increase the thickening time of the cement composition.

TABLE 1

| Composition # | Conc. of organic acid (% bwoc) | Conc. of polymeric mixture (gal/sk) | Temperature (° F.) | Thickening Time (hrs:mins) |
| --- | --- | --- | --- | --- |
| 1 | 1 | 0.3 | 300 | 7:28 |
| 2 | 0 | 0.3 | 300 | 0:30 |
| 3 | 1 | 0 | 300 | 1:55 |
| 4 | 0.5 | 0.2 | 200 | 5:28 |
| 5 | 1 | 0.3 | 300 | 7:28 |
| 6 | 2 | 0.3 | 350 | 9:30 |
| 7 | 2 | 0.3 | 360 | 10:12 |
| 8 | 2 | 0.3 | 370 | 10:20 |
| 9 | 2 | 0.3 | 380 | 1:00 |
| 10 | 2 | 0.3 | 400 | 0:55 |
| 11 | 1 | 0.3 | 300 | 7:28 |
| 12 | 1 | 0.25 | 300 | 3:27 |
| 13 | 1 | 0.2 | 300 | 2:58 |

Table 2 contains rheology data for a cement composition containing: the polymeric mixture at a concentration of 0.3 gal/sk and Fe-2™ organic acid at a concentration of 2% bwoc at temperature of 71° F. (21.7° C.). As can be seen in Table 2, the cement composition exhibited good rheology. This indicates that the organic acid and the polymeric mixture did not adversely affect other desirable properties of the composition.

TABLE 2

| RPM | Values |
| --- | --- |
| 3 | 4 |
| 6 | 6 |
| 30 | 14 |
| 60 | 26 |
| 100 | 39 |
| 200 | 74 |
| 300 | 114 |
| 600 | 218 |

FIG. 1 is a graph of compressive strength in psi versus time in hours for a cement composition having a density of 15.0 ppg (1.797 kg/L) and containing the following ingredients: tap water at a concentration of 40% bwoc; ThermaLock™ cement comprising calcium aluminate; the polymeric mixture at a concentration of 0.2 gal/sk and Fe-2™ organic acid at a concentration of 1% bwoc as the set retarders; and D-Air 3000L™ defoamer at a concentration of 0.02 gal/sk. Compressive strength was measured at a temperature of 400° F. (204.4° C.) and a pressure of 10,000 psi (68.9 MPa) from a time of zero to 96 hours (4 days).

As can be seen in FIG. 1, the cement composition developed a compressive strength of greater than 1,750 psi (12.1 MPa) at a time of 12 hours. Moreover, the composition had a compressive strength of greater than 2,500 psi (17.2 MPa) at a time of 96 hours. This data indicates that the presence of the set retarders does not adversely affect the compressive strength of the cement composition. The cement composition also had an initial setting time of 2 hours and 14 minutes. This indicates that the presence of the set retarders does not unnecessarily delay the initial setting or final setting of the cement composition.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of cementing in a subterranean formation comprising:
 introducing a cement composition into the subterranean formation, wherein the cement composition comprises:

(A) a calcium aluminate cement;
(B) water;
(C) an organic acid; and
(D) a polymeric mixture comprising:
   (i) water;
   (ii) citric acid;
   (iii) a first polymer, wherein the first polymer:
      (a) comprises a cellulose backbone and carboxymethyl functional groups; and
      (b) has a molecular weight of less than 100,000; and
   (iv) a second polymer, wherein the second polymer:
      (a) comprises a lignosulfonate; and
      (b) has a molecular weight of less than 100,000,
   wherein a test composition consisting essentially of: the cement; the water; the organic acid; and the polymeric mixture, and in the same proportions as in the cement composition has a thickening time of at least 5 hours at a temperature of 300° F. (148.9° C.) and a pressure of 10,000 psi (68.9 MPa); and
allowing the cement composition to set.

2. The method according to claim 1, wherein the water is selected from the group consisting of freshwater, brackish water, and saltwater, in any combination thereof in any proportion.

3. The method according to claim 1, wherein the organic acid is selected from the group consisting of citric acid, tartaric acid, lactic acid, ascorbic acid, and combinations thereof.

4. The method according to claim 1, wherein the first polymer, the second polymer, or the first and the second polymers have a molecular weight of less than about 30,000.

5. The method according to claim 1, wherein the first polymer, the second polymer, or the first and the second polymers have a molecular weight of less than about 25,000.

6. The method according to claim 1, wherein the organic acid and the polymeric mixture are in at least a sufficient concentration such that the test composition has a thickening time of at least 5 hours at at least one temperature in the range of about 300° F. to about 370° F. (about 148.9° C. to about 187.8° C.) and a pressure of 10,000 psi (68.9 MPa).

7. The method according to claim 1, wherein the cement composition has a thickening time of at least 5 hours at a temperature of 300° F. (148.9° C.) and a pressure of 10,000 psi (68.9 MPa).

8. The method according to claim 7, wherein the organic acid and the polymeric mixture are in at least a sufficient concentration such that the cement composition has a thickening time in the range of about 5 to about 15 hours at at least one temperature in the range of about 300° F. to about 370° F. (about 148.9° C. to about 187.8° C.) and a pressure of 10,000 psi (68.9 MPa).

9. The method according to claim 1, wherein the organic acid and the polymeric mixture are in a concentration equal to or less than a sufficient concentration such that the cement composition has a setting time of less than 48 hours at a temperature of 300° F. (148.9° C.).

10. The method according to claim 1, wherein the organic acid is in a concentration in the range of about 0.2% to about 4% by weight of the cement.

11. The method according to claim 1, wherein the polymeric mixture is in a concentration in the range of about 0.05% to about 10% by weight of the cement.

12. The method according to claim 1, wherein the cement composition further comprises other additives.

13. The method according to claim 12, wherein the other additives are selected from the group consisting of a filler, a fluid loss additive, a friction reducer, a light-weight additive, a defoaming agent, a high-density additive, a mechanical property enhancing additive, a lost-circulation material, a filtration-control additive, a thixotropic additive, and combinations thereof.

14. The method according to claim 1, wherein the cement composition has a density in the range of about 9 to about 22 ppg.

15. The method according to claim 1, wherein the subterranean formation has a bottomhole temperature in the range of about 200° F. to about 370° F. (about 93.3° C. to about 187.8° C.).

16. The method according to claim 15, wherein the organic acid and the polymeric mixture are in at least a sufficient concentration such that the cement composition has a thickening time in the range of about 5 to about 15 hours, at the bottomhole temperature and pressure of the well.

17. The method according to claim 1, wherein the subterranean formation is penetrated by a well.

18. The method according to claim 17, wherein the well is a high-temperature well, a high-pressure well, a geothermal well, a sour gas well, or an acid gas well.

19. The method according to claim 1, further comprising at least one of the following steps: perforating, fracturing, or performing an acidizing treatment, wherein the step is performed after the step of allowing.

* * * * *